United States Patent [19]
Hoffman et al.

[11] Patent Number: 4,477,089
[45] Date of Patent: Oct. 16, 1984

[54] HONEYCOMB SEAL FOR TURBINE ENGINES

[75] Inventors: Paul L. Hoffman, Stratford; Joseph C. Manente, Jr., Monroe, both of Conn.

[73] Assignee: Avco Corporation, Stratford, Conn.

[21] Appl. No.: 401,926

[22] Filed: Jul. 26, 1982

[51] Int. Cl.³ .................... F16J 15/28; F16J 15/40
[52] U.S. Cl. .................... 277/153; 228/181; 415/174
[58] Field of Search ............... 277/53–57; 76/101 R; 228/174, 181; 415/174

[56] References Cited

U.S. PATENT DOCUMENTS

| | | | |
|---|---|---|---|
| 2,946,609 | 7/1960 | Comery | 277/53 |
| 2,963,307 | 12/1960 | Bobo | 277/53 |
| 2,998,991 | 9/1961 | Spencer | 277/53 |
| 3,046,648 | 7/1962 | Kelly | 277/53 |
| 3,123,908 | 3/1964 | Boller | 228/181 |
| 4,411,381 | 10/1983 | Ittner | 228/181 |

Primary Examiner—Robert I. Smith
Attorney, Agent, or Firm—Ralph D. Gelling

[57] ABSTRACT

An improved honeycomb seal is provided for turbine engines. The subject honeycomb structure comprises a plurality of identical rings. Each ring has a plurality of radially extending convolutions defining alternating ridges and valleys. The rings are fixedly arranged in abutting relationship to define a tubular honeycomb structure having an array of radially extending honeycomb cells. The resultant honeycomb structure is adaptable to both large and small diameter turbine engines. Furthermore, the individual cells of the honeycomb structure can be constructed to any width or depth.

11 Claims, 8 Drawing Figures

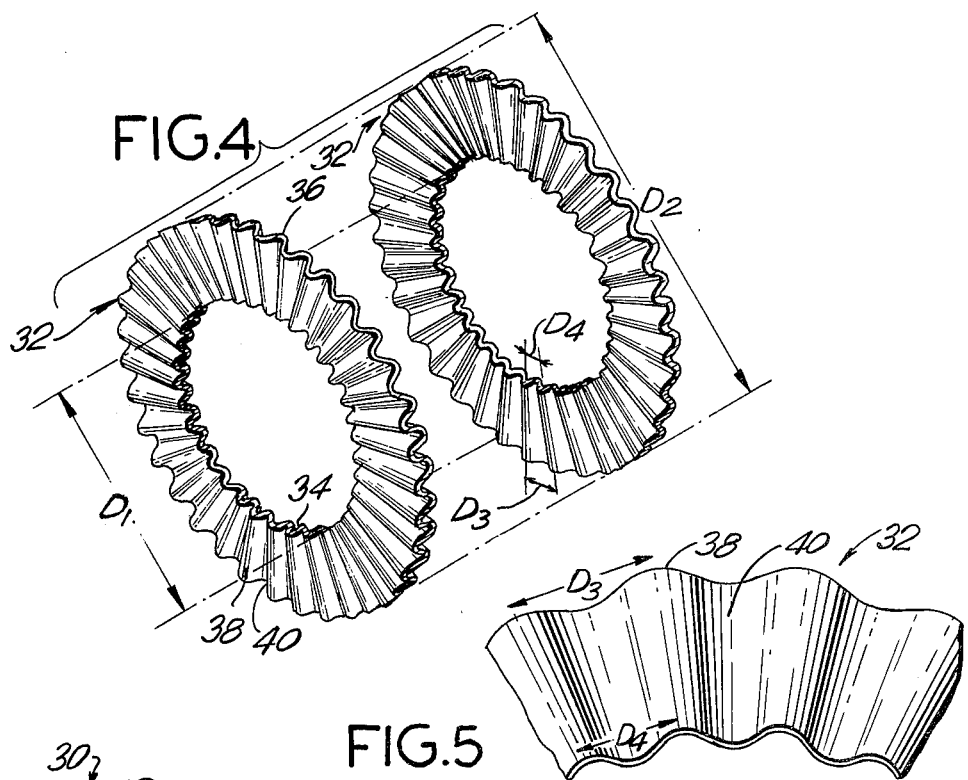
FIG. 4
FIG. 5
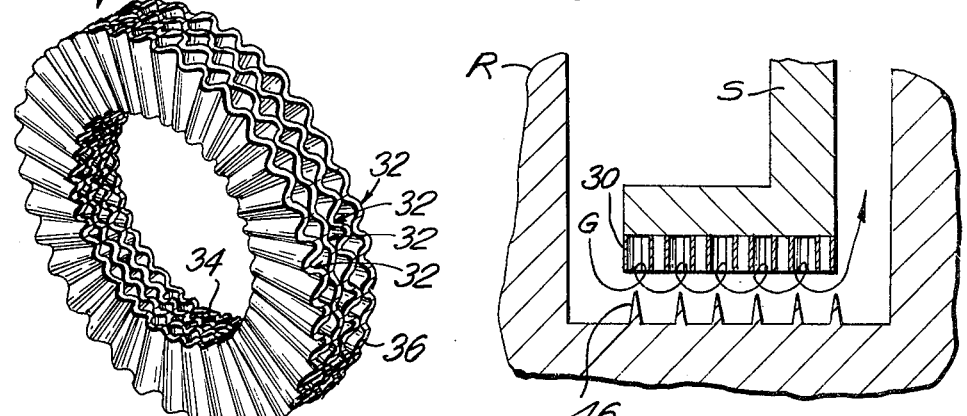
FIG. 6
FIG. 8
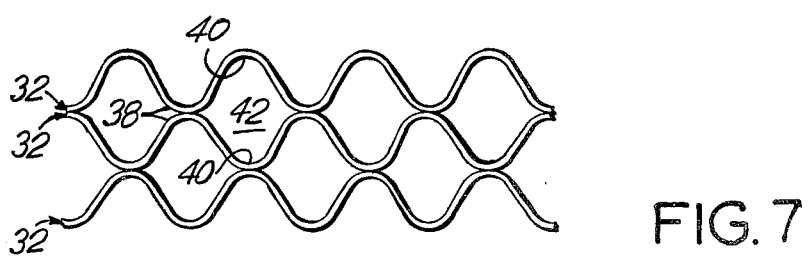
FIG. 7

HONEYCOMB SEAL FOR TURBINE ENGINES

BACKGROUND OF THE INVENTION

A gas turbine engine includes an elongated member designed to rotate about its longitudinal axis. This rotating member is located within a generally tubular casing which remains stationary relative to the rotating member, with the longitudinal axes of the rotating member and the tubular casing being colinear. The rotating member includes a plurality of blade structures fixedly attached to the rotating member, and disposed along the longitudinal axis of the rotating member. In turn, each blade structure includes a plurality of blades disposed radially about the rotating member. Disposed between adjacent blade structures and attached to the stationary tubular casing are annular nozzle structures. Each annular nozzle structure includes a plurality of vanes disposed about the nozzle structure. Hot pressurized gas directed into the turbine engine is further directed by the vanes on the nozzle structures to strike the blades on the rotating member at an optimum angle causing the rotation of the rotating member.

The effectiveness of the turbine engine varies directly with the proportion of gas that impinges upon the blades of the rotating member. However, a certain amount of gas unavoidably leaks through the space between the outermost points of the rotating members, or rotors, and the innermost points of the stationary members, or stators. This flow of gas through the space between the rotors and stators is caused partly by the general movement of gas through the turbine engine, and partly by the fact that gas pressure on the downstream side of a rotor or stator is lower than the gas pressure on the upstream side.

The amount of gas that escapes between the rotor and stator is reduced by decreasing the distance between the rotor and stator. However, it is well known that for any given clearance, the amount of gas flowing between the rotor and stator can be reduced even further by providing a structure that will create turbulence in the gas flowing between the rotor and stator. For example, a plurality of spaced annular knife edges on either the rotor or stator defines a labyrinth seal which is known to create a turbulence that will inhibit the flow of gas between the rotor and stator. It is also known that as the space between successive annular knife edge structures in the labyrinth seal increases, the amount of turbulence created thereby also increases.

It is known that a honeycomb structure will cause a turbulent effect similar to that described above for the labyrinth seal. More specifically, the honeycomb structure is attached to either the rotor or stator so that the longitudinal axis of each honeycomb cell is aligned in a generally radial direction. As with labyrinths, the turbulence created increases with the width of each honeycomb cell. The effectiveness of the honeycomb seal also varies with the depth of the cells, and the radial distance, or gap, between the rotor and stator that is not filled by the honeycomb structure. Typically this gap would be in the range of 0.005 inches to 0.040 inches. The size of the gap selected would depend on the width of the individual honeycomb cells.

The attributes of various seals are explained in detail in the publication of C.A. Mayer and J. A. Laurie III "The Leakage Thru Straight and Slant Labyrinth and Honeycomb Seals" Journal of Engineering for Power (Oct. 1975), the disclosure of which is incorporated herein by reference. For example, the aforementioned publication presents data describing the discharge coefficient of a turbine engine for various seal configurations and at various radial seal clearances between the stationary and moving parts of the turbine engine. Specifically for a radial seal clearance of 0.020 inches and for a 0.5 ratio of static pressure downstream to total pressure upstream various discharge coefficients can be compared under these conditions a honeycomb seal with 0.187 inch wide 0.750 inch long cells had a discharge coefficient of 0.50; a honeycomb seal with 0.125 inch wide 0.750 inch long cells had discharge coefficient of 0.59; a three-labyrinth straight seal 1.00 inch long with a 0.50 inch pitch had a discharge coefficient of 0.62; and a single labyrinth seal had a discharge coefficient of 0.077. Thus the discharge coefficient for wide honeycomb cells was only 85 percent of the value for narrower cells, and only 64 percent of the value for the single labyrinth seal. Hence it is apparent that the effectiveness of a turbine engine varies inversely with the discharge coefficient. As a result, it is apparent that honeycomb seals with wide cells offer substantial operational benefits.

Many honeycomb arrangements and methods for making honeycomb structures are known, including those disclosed in: U.S. Pat. No. 2,963,307 which issued to Bobo on Dec. 6, 1960; U.S. Pat. No. 3,046,648 which issued to Kelly on July 31, 1962; U.S. Pat. No. 3,603,599 which issued to Laird on Sept. 7, 1971; U.S. Pat. No. 4,063,742 which issued to Watkins on Dec. 20, 1977; U.S. Pat. No. 4,162,077 which issued to Crow et al on July 24, 1979; and U.S. Pat. No. 4,218,066 which issued to Ackerman on Aug. 19, 1980. Generally, the prior art patents cited above provide a planar honeycomb sheet, with the longitudinal axis of each honeycomb cell being generally perpendicular to the plane of the sheet. This planar array of honeycomb cells is subsequently bent into a tubular configuration, and is affixed to either the rotor or stator of the turbine engine. However, since the circumference varies directly with the diameter of a circle, the width of an individual cell measured at the radially outer surface of the tubular structure will be greater than the width of the same cell measured at the radially inner surface. Thus the outermost part of the tubular structure is subjected to a tension force, while the innermost part is subjected to compression.

Honeycomb seals with the structural features described above are acceptable for use in a large turbine engine because the difference between the inner and outer circumferences on seals for large turbine engines is small compared to the total circumference. However, in recent years small turbine engines have become increasingly desirable because of their size and weight characteristics. Specifically, in many applications the diameter onto which the seal is mounted may be less than five inches.

It has been observed that planar sheets of honeycomb structures are not readily adaptable to small diameter turbine engines, because the difference between the inner and outer circumferences on seals for small turbine engines is great compared to the total circumference. Therefore, the tension and compression forces to which individual honeycomb cells are subjected also is great. As a result, when a conventional planar honeycomb structure is bent into a tubular configuration for use in a small diameter turbine engine, the honeycomb structure tends to warp, whereby the diameter of the resultant tubular honeycomb structure varies along its length. This phenomenon reflects the tendency of the structure to accommodate the differential tensile and compressive forces by expanding and contracting about more than one axis. If, in forming the tubular structure, the circumferential expansion and contraction is confined to variations about the longitudinal axis of the tube, individual cells and joints between adjacent cells will be more susceptible to failure in small diameter applications. For example, the part of a honeycomb cell on the inside of the tubular structure may tend to buckle under the compression force. Conversely, the part of each cell on the outside will tend to elongate under tension, causing possible failure of the cell wall or the joints between cells.

One approach to overcoming these problems in a small diameter turbine engine is to provide a honeycomb structure with short and narrow individual honeycomb cells. For example, a planar honeycomb sheet may be bent into a tubular configuration having an outside diameter of five inches, if individual cells have a length of less than 0.250 inches and a cross sectional width of less than 0.062 inches. By providing short cells, such as this, the difference between the inner and outer diameters of the tubular structure will be small; and therefore, the difference between the inner and outer circumferences also will be small. As a result, the differential expansion and contraction may be accommodated by the honeycomb structure. Similarly, if individual cell widths are small, there will be more cells disposed about the circumference, and the amount of circumferential variation imposed upon each cell can readily be accommodated. However, as mentioned above, honeycomb cells with large cross sectional widths, typically in the range of 0.125 inches to 0.375 inches are more effective in reducing gas leakage then cells with small cross sections. Additionally, it is often desirable to provide deep cells which are partially filled with an insulating material to reduce the heating of areas adjacent to the turbine engines. However, the differential tension and compression on the inner and outer surfaces of the prior art honeycomb structures had prohibited wide and long cells for honeycomb seals on small turbine engines. For these reasons, the small diameter turbine engines have been used almost exclusively with the labyrinth selas described above.

Accordingly, it is an object of the present invention to provide a honeycomb seal that is adaptable to either large or small turbine engines.

It is a further object of the subject invention to provide a honeycomb seal structure that can be adapted to any individual cell size.

It is still a further object of the subject invention to provide a honeycomb seal structure that retains its dimensional stability in applications on small turbine engines.

It is another object of the subject invention to provide a honeycomb seal structure that can be readily manufactured and assembled.

Another object of the subject invention is to provide a honeycomb seal structure with enhanced structural integrity.

BRIEF DESCRIPTION OF THE DRAWINGS

FIG. 4 is an exploded perspective view of two rings of the subject honeycomb structure.

FIG. 5 is a perspective view of one section of one ring used in the subject honeycomb seal structure.

FIG. 6 is a perspective view of the constructed honeycomb seal structure.

FIG. 7 is a radial view of a honeycomb structure made according to the teachings of the subject invention.

FIG. 8 is a partial cross sectional view of a turbine engine showing the subject honeycomb structure used in combination with a labyrinth seal.

DETAILED DESCRIPTION OF THE PREFERRED EMBODIMENT

Figure 1:
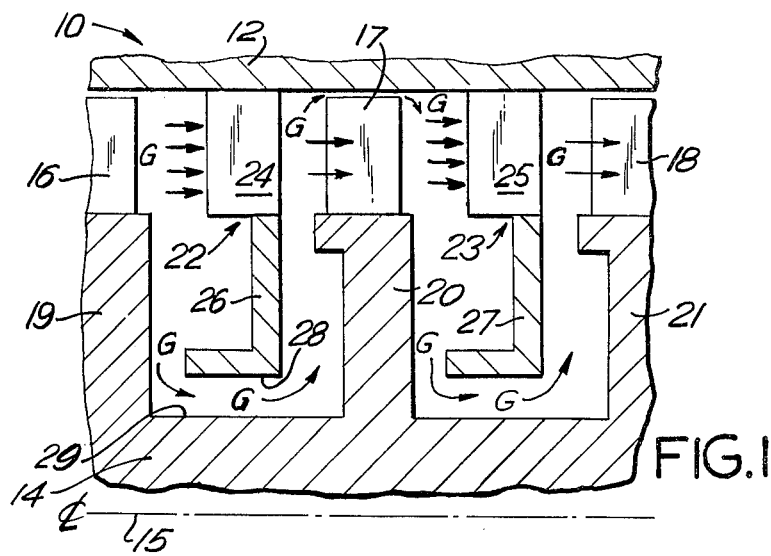
FIG. 1 a partial cross sectional view of a turbine engine showing at least part of three rotor blades and the vanes disposed therebetween, with no seals between the rotating and stationary parts.

Turning to FIG. 1, a portion of turbine engine 10 includes stationary casing 12 and rotor 14. The latter is generally cylindrical, and is located centrally within casing 12 such that casing 12 and rotor 14 have a common longitudinal axis 15. Blades 16, 17 and 18 extend in a generally radial direction from annular blade-mounting structures 19, 20 and 21 respectively on rotor 14. Each blade 16, 17, or 18 and its associated blade-mounting structure 19, 20 or 21 represents a separate stage in turbine engine 10 through which gas G sequentially passes. Other blades extend in a generally radial direction from each annular blade-mounting structure 19, 20 or 21 such that a generally circular array of blades is provided at each stage of turbine engine 10. Additional stages may be included in turbine engine 10 with annular blade-mounting structures and arrays of blades extending from rotor 14 at other axial locations thereon.

Stationary nozzle structures 22 and 23 extend inwardly in a generally radial direction from casing 12 toward rotor 14. Nozzle structures 22 and 23 each respectively includes an array of vanes 24 and 25 that extend radially between casing 12 and annular shrouds 25 and 26. Additional nozzle structures are disposed axially along stationary casing 12 between successive arrays of rotor blades.

Gas, indicated generally by arrows G, is forceably directed into turbine engine 10. Stationary nozzle structures 22 and 23 channelize gas G toward blades 17 and 18 respectively at an optimal angle causing the rotation of rotor 14. Annular shrouds 26 and 27 and annular blade mounting structures 20 and 21 function to reduce the amount of gas that travels through turbine engine 10 without being directed by vanes 24 and 25 into blades 17 and 18. However, despite annular shrouds 26 and 27 and annular blade mounting structure 20 and 21, some gas G does flow between the innermost points of the stationary members and the outermost points on the rotating member. This flow of gas between the stationary and moving parts occurs because the gas pressure drops as the gas passes successive arrays of vanes and blades. For example, arrows G show that between blades 16 and 17 there will be a flow of gas between innermost edge 28 of shroud 26 and surface 28 on rotor 14. Gas similarly will flow between the tops of blades 16, 17 and 18, and casing 12. The gas G that flows between the stationary and moving parts desirably would have been directed through vanes 24 and 25 to strike blades 17 and 18, and thereby turn rotor 14. Thus, the effectiveness of turbine 10 varies inversely with the amount of gas that flows between the stationary and moving parts.

Figure 2:
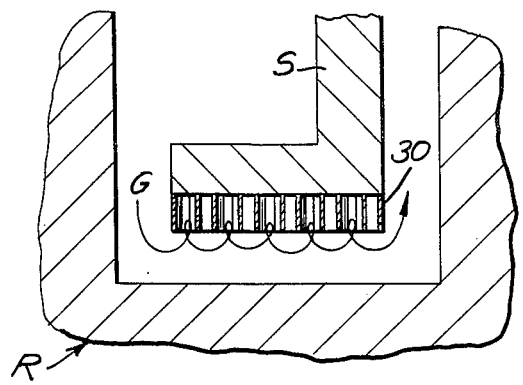
FIG. 2 is a partial cross sectional view of a turbine engine having a honeycomb seal structure affixed to the rotor portions of the engine.
Figure 3:
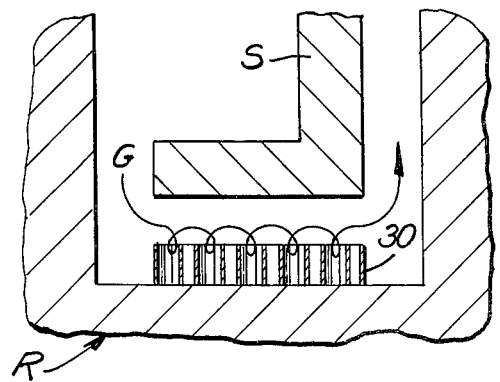
FIG. 3 is a partial cross sectional view of a turbine engine having a honeycomb seal structure affixed to the stator portion of the engine.

FIG. 2 shows the portion of turbine 10 where stator S is closest to rotor R. Fixedly attached to stator S is honeycomb 30. As depicted by arrows G in FIG. 2, the honeycomb structure 30 attached to stator S causes turbulence in gas G thereby minimizing the amount of gas G that flows between stator S and rotor R. FIG. 4 shows the same principal as FIG. 2; however, the honeycomb structure 30 in FIG. 3 is affixed to the rotor portion R instead of being affixed to the stator portion S, as shown in FIG. 2.

Turning to FIG. 4, the new and improved honeycomb seal of the subject invention is formed by a plurality of substantially identical metallic rings 32. Rings 32 are made of an abradable metal having a thickness of approximately 0.005 inches. The abradable characteristics of the rings are to accommodate occasional contact between the rotor and stator portions during transient operations of the turbine engine. Each ring 32 has an inner perimeter 34 defining a circle having a diameter of $D_1$. Similarly, each ring 32 has an outer perimeter 36 defining a circle having a diameter of $D_2$. Each ring 32 also includes a plurality of radially aligned essentially sinusoidal convolutions defining evenly spaced and alternating ridges 38 and valleys 40. By this arrangement, the structural feature that is viewed as a ridge 38 from one side of ring 32, is viewed as a valley 40 from the other side of ring 32.

As shown more clearly in FIG. 5, the chordal distance $D_3$ between adjacent ridges at the outer perimeter 36 of each ring 32 along substantially their entire respective radial lengths is greater than the chordal distance $D_4$ between adjacent ridges at the inner perimeter 34. This accounts for the direct relationship between radius and circumference.

Rings 32 are arranged relative to one another such that their centroids are colinear. Furthermore, rings 32 are placed adjacent one another so that the ridges 38 of one ring 32 abut the ridges 38 of the adjacent ring 32, as shown in FIGS. 6 and 7. This construction is enabled, in part, by the fact that the amplitude of the ridges 38 and valleys 40 are substantially constant along their respective radial lengths, as illustrated most clearly in FIGS. 6 through 8. The two valleys 40 between adjacent pairs of abutting ridges 38 define an enclosed cell 42, as shown most clearly in FIG. 7.

Returning to FIG. 6, the resultant honeycomb structure 30 is generally cylindrical, and has a plurality of radially aligned cells. Because of the cylindrical configuration of honeycomb structure 30, it is unnecessary to bend the honeycomb seal to fit the cylindrical shape of the turbine engine 10. Thus, unlike the prior art honeycomb seals, the new and improved honeycomb seal of the subject invention is not subjected to the differential tension and compression and the resultant expansion and contraction at its outer and inner surfaces respectively. As a result, the subject honeycomb seal can be adapted to large cell sizes on small diameter seals, thereby realizing the substantial advantages provided by wide cells as explained previously. Despite the value of the subject invention for small turbine engines, the structure described herein can be adapted equally well to large turbine engines. Furthermore, the subject honeycomb structure 30 can be adapted to be attached to either the rotor or the stator.

In a typical application, the subject honeycomb structure 30 is adapted to be attached to the inner edge 28 of stator 22 on turbine engine 10 in the manner shown by FIG. 2. Returning to FIG. 4, each ring 32 from which the honeycomb seal structure 30 is formed would have an inside diameter of 5.536 inches and an outside diameter "EDM" machined to 5.786 inches. The radial distance between the outermost point on the rotor and the innermost point on the honeycomb seal would be approximately 0.020 inches.

The corrugated or convoluted pattern disposed radially about the ring would be provided by a combination of appropriately configured male and female stamping dies. In the typical example mentioned above, each ring 32 includes seventy ridges 38 and seventy valleys 40. Each complete sinusoidal cycle represents a radial arc of approximately 5° 8′ 34″. The axial distance from the top of one ridge 38 to the bottom of the valley 40 is approximately 0.125 inches. Thus on the constructed honeycomb structure 30, the axial width of each cell 42 is 0.250 inches. This particular combination of a relatively large cell size on a relatively small diameter seal would be difficult, if not impossible, to obtain in the prior art honeycomb seals. Adjacent rings 32 are welded to one another at their ridges 38 by standard gang welding techniques. The typical honeycomb structure 30 referred to herein, includes fourteen rings welded together in this manner. The outer perimeter 36 of the resultant honeycomb structure 30 would then be brazed to a solid metallic ring which in turn would be affixed to the stator. In certain applications, it may be desirable to increase the difference between the inside and outside diameters of the honeycomb structure 30, thereby providing longer cells, and then to partially fill each cell 42 with an insulating material. In still other applications, it may be desirable to use the honeycomb structure 30 in combination with a labyrinth seal comprising a plurality of annular knife edges 46, as shown in FIG. 8. By this arrangement, the subject honeycomb structures 30 are affixed to the stator S and a series of spaced annular knife edges 44 are affixed to the rotor R.

In summary, there is provided a new and improved honeycomb seal structure that is equally adaptable to large and small turbine engines. Furthermore, the resultant honeycomb structure can be adapted to have cells of any width or depth. The structure comprises a plurality of identically shaped rings, with each ring having a plurality of radially aligned convolutions or corrugations disposed about the circumference thereof. The corrugations or convolutions on each ring define a series of alternating radially extending ridges and valleys. The rings are arranged and secured adjacent to one another so that the centroids of the respective rings are colinear and so that the ridges of adjacent rings abut.

While the preferred embodiment of the subject invention has been described and illustrated, it is obvious that various changes and modifications can be made therein without departing from the spirit of the invention which should be limited only by the scope of the appended claims.

We claim:

1. A seal for minimizing gas leakage between the rotor and stator assemblies of a turbine engine, said seal comprising a plurality of substantially identical metallic rings, each said ring having a pair of opposed sides and a plurality of radially extending convolutions disposed thereabout defining alternating ridges and valleys, such that each said convolution defines a ridge with respect to one said side of said ring and a valley with respect to the opposed side of said ring, the distance between adjacent convolutions on each said ring increasing linearly with the distance from the center of said ring, and the amplitude of each said convolution being substantially constant along its entire radial length, said plurality of rings being fixedly arranged with their respective centers being substantially colinear and with the ridges on facing sides of adjacent rings being in abutting relationship along substantially their entire radial length such that the valleys between adjacent pairs of abutting ridges define a radially extending cell, a plurality of said abutting ridges being fixedly secured to one another such that said rings define a tubular honeycomb structure having radially aligned cells, whereby the attachments of said ridges to one another are substantially free of compression at the inner portions of said tubular honeycomb structure and substantially free of tension at the outer portions of said tubular honeycomb structure.

2. A seal as in claim 1 wherein said convolutions in each said ring define a sinusoidal pattern.

3. A seal as in claim 1 wherein said abutting rings are fixedly secured by welding.

4. A seal as in claim 1 wherein the outer surface of said tubular honeycomb structure is fixedly attached to the stator portion of said turbine engine.

5. A seal as in claim 4 wherein the turbine engine includes a plurality of annular knife edge structures defining a labyrinth seal on the rotor portion thereof such that the labyrinth seal cooperates with the tubular honeycomb structure for minimizing gas leakage between the rotor and stator assemblies of the turbine engine.

6. A seal as in claim 1 wherein the inner surface of said tubular honeycomb structure is fixedly attached to the rotor portion of said turbine engine.

7. A seal as in claim 6 wherein the turbine engine includes a plurality of annular knife edge structures defining a labyrinth seal on the stator portion thereof, such that the labyrinth seal cooperates with the tubular honeycomb structure for minimizing gas leakage between the rotor and stator assemblies of the turbine engine.

8. A method of making a honeycomb seal comprising the sequential steps of:

forming a plurality of substantially identical unitary metallic rings, each said ring having a plurality of radially extending convolutions defining alternating ridges and valleys disposed thereabout, such that each said convolution defines a ridge with respect to one said side of said ring and a valley with respect to the opposed side of said ring, the distance between adjacent convolutions on each ring increasing linearly with the distance from center of each ring and the amplitude of each convolution being substantially constant along its entire radial length;

arranging said rings into abutting relationship such that the ridges on facing sides of adjacent rings abut along substantially their entire radial length, defining radially extending honeycomb cells therebetween; and fixedly securing said rings in abutting relationship along said abutting ridges to define an integral tubular honeycomb seal structure, whereby the inner portions of the attachments of the abutting ridges of said tubular honeycomb structure are substantially free of compression and the outer portions thereof are substantially free of tension.

9. A method as in claim 8, wherein said convolutions define a sinusoidal pattern.

10. A method as in claim 8, wherein said rings are die stamped utilizing a mating pair of male and female dies.

11. A method as in claim 8, wherein said rings are fixedly secured into abutting relationship by welding.

* * * * *